UNITED STATES PATENT OFFICE.

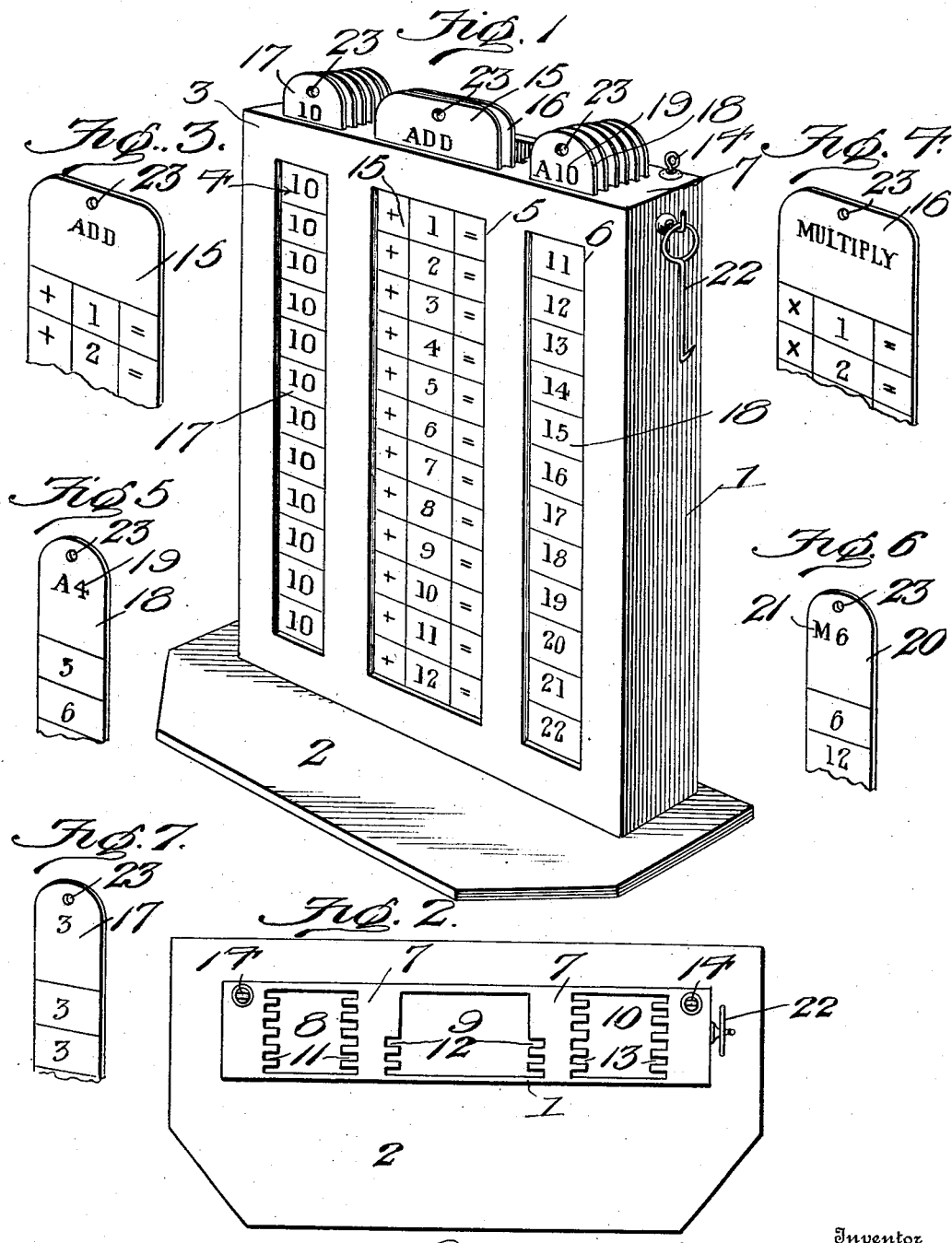

GEORGE BROOKS OLDROYD, OF EAST ST. LOUIS, ILLINOIS.

EDUCATIONAL DEVICE.

No. 894,043.

Specification of Letters Patent.

Patented July 21, 1908.

Application filed September 13, 1907. Serial No. 392,730.

*To all whom it may concern:*

Be it known that I, GEORGE BROOKS OLDROYD, a citizen of the United States, residing at East St. Louis, in the county of St. Clair and State of Illinois, have invented new and useful Improvements in Educational Devices, of which the following is a specification.

This invention relates to educational appliances and is designed more particularly for illustrating certain examples in addition and multiplication.

One of the principal objects of the same is to provide a device of simple construction which will give certain examples in addition with the solutions thereto and certain examples in multiplication with the solutions to said examples.

Another object is to provide a casing with a series of slides having examples thereon and the solutions to said examples, said slides being removable to be replaced by others giving quite an arrangement of examples and solutions therefor.

These and other objects may be attained by means of the construction illustrated in the accompanying drawing, in which:—

Figure 1 is a perspective view of an educational appliance made in accordance with my invention. Fig. 2 is a plan view of the same. Fig. 3 is a perspective view of the upper end of a slide relating to addition. Fig. 4 is a similar view of the upper end of the multiplication slide. Fig. 5 is a perspective view of the upper end of one of the auxiliary slides or cards relating to addition. Fig. 6 is a similar view of the auxiliary slide relating to multiplication. Fig. 7 is a perspective view of the upper end of one of the auxiliary slides.

Referring to the drawing for a more specific description of my invention, the numeral 1 designates the casing mounted upon a base 2 and provided with a front 3 having a series of sight openings 4, 5 and 6 therein. The top 7 of the casing is provided with a series of openings 8, 9 and 10 therein, said openings being provided with grooves 11, 12 and 13 therein to accommodate a series of slides. Suspending devices 14 are connected to the top of the casing.

In the center sight opening 5 and disposed in the grooves 12 in the center of the casing are two slides one, 15, relating to addition and containing a series of numbers from one to twelve in the center of the slide and a plus mark and a parallel or equal mark arranged at the opposite sides of the center column of figures. A multiplication slide 16 is also located in one of the grooves 12, said multiplication slide having the word "Multiply" on the upper end thereof and a series of numerals from 1 to 12 arranged centrally thereon in a vertical column while at the left of the column of numerals, multiplication marks are applied to each numeral and a parallel or equal mark being also used upon the opposite sides of the numerals as shown in Fig. 4. Arranged behind the sight opening 4 in the grooves 11 are series of auxiliary slides 17 containing each a set of numerals in a vertical column, the faces of the different slides containing like numerals in vertical columns. Behind the sight opening 6 and disposed in grooves 13 of the space 10 are auxiliary addition slides 18 each containing a series of progressive numerals. The slides 18 at the top are each provided with an indicator 19 consisting of the letter *a* referring to addition and a numeral referring to the first number on the slide.

When the device is to be used for illustrating multiplication, the slide designated "Multiply" is placed in the front groove in place of the slide marked "Add" and the auxiliary slides 20 which are also provided with an indicator 21 consisting of the letter *m* and the first number on the slide are placed in the grooves 13 in the space 10 behind the sight opening 6. A hook 22 may be used for withdrawing the slides, said hook adapted to engage the perforations 23 in the slides.

From the foregoing it will be obvious that by various arrangements of the slides certain examples in addition and multiplication may be given with the solution to each and other examples in subtraction or fractions may also be illustrated by a proper arrangement of numerals on the slides.

My device is of simple construction and can be used to advantage in instructing scholars in arithmetic.

Having thus described the invention, what is claimed as new, is:—

An educational appliance comprising a casing having a central sight opening in the front thereof and an opening at each side of said central opening, said casing also having openings in the top, and grooves in the sides of said openings, a series of auxiliary slides mounted in the grooves in the openings at the sides of the central opening, and slides fitted in the central opening in the groove therein, said slide relating to addition and multiplication.

In testimony whereof I affix my signature in presence of two witnesses.

GEORGE BROOKS OLDROYD.

Witnesses:
E. L. GUIGNON,
J. W. HANNAHER.